(12) United States Patent
Hara (10) Patent No.: US 9,199,684 B2
(45) Date of Patent: Dec. 1, 2015

(54) STRADDLE TYPE VEHICLE

(71) Applicant: HONDA MOTOR CO., LTD., Tokyo (JP)

(72) Inventor: Takumi Hara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/560,844

(22) Filed: Dec. 4, 2014

(65) Prior Publication Data

US 2015/0158540 A1 Jun. 11, 2015

(30) Foreign Application Priority Data

Dec. 6, 2013 (JP) ................................ 2013-253261

(51) Int. Cl.
| | |
|---|---|
| *B62J 35/00* | (2006.01) |
| *B62J 37/00* | (2006.01) |
| *B62K 11/02* | (2006.01) |
| *F02M 25/08* | (2006.01) |
| *B62K 11/10* | (2006.01) |

(52) U.S. Cl.
CPC ........ *B62J 35/00* (2013.01); *B62J 37/00* (2013.01); *B62K 11/10* (2013.01); *F02M 25/089* (2013.01); *F02M 25/0836* (2013.01); *F02M 25/0854* (2013.01); *B62K 2202/00* (2013.01)

(58) Field of Classification Search
CPC .......... B62J 35/00; B62J 37/00; B62K 11/10; B62K 2202/00; F02M 25/0836; F02M 25/089
See application file for complete search history.

(56) References Cited

U.S. PATENT DOCUMENTS

| | | | | |
|---|---|---|---|---|
| 2006/0066092 A1* | 3/2006 | Miyabe | ..................... | B62J 35/00 280/833 |
| 2007/0089921 A1* | 4/2007 | Miyabe | ..................... | F01N 3/22 180/219 |
| 2007/0096452 A1* | 5/2007 | Iwasaki | ..................... | B62J 35/00 280/833 |
| 2010/0163328 A1* | 7/2010 | Hasegawa | ................ | B62J 35/00 180/225 |
| 2010/0243360 A1* | 9/2010 | Inaoka | ..................... | B62J 35/00 180/225 |
| 2011/0186370 A1* | 8/2011 | Ishii et al. | ................ | B62J 37/00 180/69.4 |
| 2012/0240902 A1* | 9/2012 | Kondo et al. | ............ | B62J 35/00 123/518 |

FOREIGN PATENT DOCUMENTS

JP 4135431 B 8/2008

* cited by examiner

*Primary Examiner* — Tony Winner
(74) *Attorney, Agent, or Firm* — Birch, Stewart, Kolasch & Birch, LLP (57) ABSTRACT

A straddle vehicle wherein a drain pipe from the fuel tank and a drain pipe from a canister can be efficiently connected. A canister includes at least a part being disposed below a fuel tank above a rear fender. A tank cover covers the upper surface side of the fuel tank. The tank cover forms a first tray portion in a recessed shape in the periphery of a fuel filler opening of the fuel tank. The first tray portion has a first drain portion to which a base end portion of a first drain pipe is connected. The rear fender forms a second tray portion in a recessed shape wherein a tip portion of the first drain pipe and a tip portion of a second drain pipe connected to a base end portion are connected to the canister. The second tray portion has a second drain portion discharging the liquid.

20 Claims, 10 Drawing Sheets

STRADDLE TYPE VEHICLE

CROSS-REFERENCE TO RELATED APPLICATIONS

The present application claims priority under 35 USC 119 to Japanese Patent Application No. 2013-253261 filed Dec. 6, 2013 the entire contents of which are hereby incorporated by reference.

BACKGROUND OF THE INVENTION

1. Field of the Invention

The present invention relates to a straddle type vehicle including motorcycle and the like.

2. Description of Background Art

In a recent trend, a straddle type vehicle includes a canister for recovering evaporated fuel from a fuel tank in order to improve the environmental performance.

The canister is connected to a charge hose for recovering the evaporated fuel in the fuel tank and for feeding the evaporated fuel to the canister. In addition, the canister is connected to a purge hose, an air introduction pipe, and a drain pipe. When the evaporated fuel is purged, an air introduction pipe introduces the air (atmospheric pressure) into the canister. The purge hose supplies the air introduced from the air introduction pipe and an air-evaporated fuel mixture absorbed by the canister to an inlet system of an engine. The drain pipe discharges the excess water and the like to the outside.

Moreover, the straddle type vehicle has a drain pipe for discharging the fuel to the outside when the fuel is overflowed from the fuel filler opening on the fuel tank or is spilled in the periphery of the fuel filler opening in refueling.

Accordingly, the straddle type vehicle requires a drain pipe for a canister and a drain pipe for a fuel tank. Positioning of the respective drain pipes becomes complicated.

For example, Japanese Patent No. 4135431 discloses an oil port that is disposed in the vicinity of a fuel filler opening, simultaneously, a tray is provided in the periphery of the fuel filler opening and the oil port, and the excess liquid from each port joins at the tray and is discharged to the outside through a canister.

However, in the configuration according to Japanese Patent No. 4135431, the excess liquid from the fuel filler opening and the oil port, namely, the fuel and the lubricating oil are fed into the canister. It would be preferable for the canister to suck the air from the outside without vapor in order to efficiently separate the fuel absorbed by the canister.

Moreover, the fuel filler opening and the oil port should be closely disposed in the above-mentioned conventional technique. Accordingly, the fuel tank and the oil tank are disposed adjacent to each other. As a result, the oil tank occupies the space for the fuel tank to be provided, which tends to influence on the capacity of the fuel tank. Application of the above-mentioned techniques in Japanese Patent No. 4135431 enables the fuel tank and the canister to be disposed adjacent to each other. When both drain pipes are commonly used, the canister influences the capacity of the fuel tank.

SUMMARY AND OBJECTS OF THE INVENTION

The present invention has been made in consideration of the above-mentioned situation and aims to provide the straddle type vehicle wherein the drain pipe from the fuel tank and the drain pipe from the canister can be efficiently positioned, simultaneously. Thus, the canister can effectively function.

As means for solving the above-mentioned problem, according to an embodiment of the present invention, a straddle type vehicle (1) has a rear frame (5d) forming a rear portion of a body frame (5), a rear fender (60) attached to the rear frame (5d), a fuel tank (25) supported on the rear frame (5d) above the rear fender (60), a canister (50) that at least a part thereof is disposed below the fuel tank (25) above the rear fender (60), and a tank cover (40) covering the upper surface side of the fuel tank (25). The tank cover (40) forms a first tray portion (41) in a recessed shape in the periphery of a fuel filler opening (26) of the fuel tank (25). The first tray portion (41) has a first drain portion (45) to which a base end portion (101a) of a first drain pipe (101) is connected. The rear fender (60) forms a second tray portion (64) in a recessed shape to which a tip portion (101b) of the first drain pipe (101) and a tip portion (102b) of a second drain pipe (102) is connected to the base end portion (102a) which is connected to the canister (50). The second tray portion (64) has a second drain portion (69) for discharging the liquid.

According to an embodiment of the present invention, the first tray portion (41) is disposed on the upper surface side of the fuel tank (25), and the second tray portion (64) is disposed below the fuel tank (25).

According to an embodiment of the present invention, a stepped portion (28), which forms a downward displaced portion (27B) with the upper surface height lowered relative to the periphery of the fuel filler opening (26), is formed on the front portion of the fuel tank (25), and the first drain portion (45) is formed so as to be inclined downwardly to the front direction along the stepped portion (28).

According to an embodiment of the present invention, a fuel pump (29) is supported on the downwardly displaced portion (27B), and the tank cover (40) has a guide portion (40f) guiding a harness (36) connected to the fuel pump (29).

According to an embodiment of the present invention, the canister (50) is disposed in the front and lower direction of the fuel tank (25), and the second tray portion (64) has a connecting portion (66) to which the first drain pipe (101) is connected in front of the canister (50).

According to an embodiment of the present invention, the rear fender (60) supports the canister (50), a charge hose (54) introducing the evaporated fuel from the fuel tank (25), a purge hose (52) supplying the evaporated fuel from the canister (50) to the inlet system, and a purge control valve (53) controlling the evaporated fuel supply in the purge hose (52).

According to an embodiment of the present invention, an article storage portion (24a) is provided in front of the fuel tank (25), and the canister (50) is disposed between the article storage portion (24a) and the fuel tank (25).

According to an embodiment of the present invention, the first drain pipe extending from the tank cover and the second drain pipe extending from the canister are connected to the second tray portion of the rear fender. Accordingly, the fuel filler opening and the canister are spaced apart from each other. As a result, the arrangement of the canister can reduce the influence on the capacity of the fuel tank. Just a single drain pipe is enough to drain the excess fuel from the second tray portion, which can suppress complication of the positioning of the drain pipes even if the fuel tank and the canister have the drain portions, respectively.

Moreover, the first drain pipe does not feed the excess liquid to the canister. Accordingly, the canister can suck the air from the outside without fuel vapor, and the canister can efficiently separate the absorbed fuel.

According to an embodiment of the present invention, the excess liquid can efficiently join to the second tray portion, even if the first tray portion and the second tray portion are provided above and below the fuel tank, respectively. The first tray portion and the second tray portion are disposed above and below the fuel tank. Accordingly, the influence on the capacity of the fuel tank due to the first tray portion and the second tray portion can be reduced.

According to an embodiment of the present invention, the first drain portion inclined downward to the front direction can be easily disposed by using the stepped portion. Simultaneously, the excess fuel from the fuel filler opening can be discharged effectively from the first drain portion due to the fact that the first drain is inclined downward to the front direction.

According to an embodiment of the present invention, the harness connected to the fuel pump is guided to the guide portion provided on the tank cover, which can simplify the positioning structure.

According to an embodiment of the present invention, the first drain pipe is connected to the second tray portion in the front direction side by avoiding the canister and the fuel tank, which can simplify the connection of the first drain pipe.

According to an embodiment of the present invention, the canister, the charge hose, the purge hose, and the purge control valve are installed on the rear fender in advance. These components can be attached to the vehicle body as a unit, which can improve the efficiency of the assembly operation.

According to an embodiment of the present invention, the space between the article storage portion and the fuel tank can be efficiently used as an installation space for the canister, which can reduce the influence on the capacity of the fuel tank due to the canister.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, the embodiment of the present invention will be explained with reference to the drawings. In the drawings referenced as blow, each arrow shows the direction as below. An arrow FR shows the front direction, an arrow UP shows the upper direction, an arrow LH shows the left direction.

Figure 1:
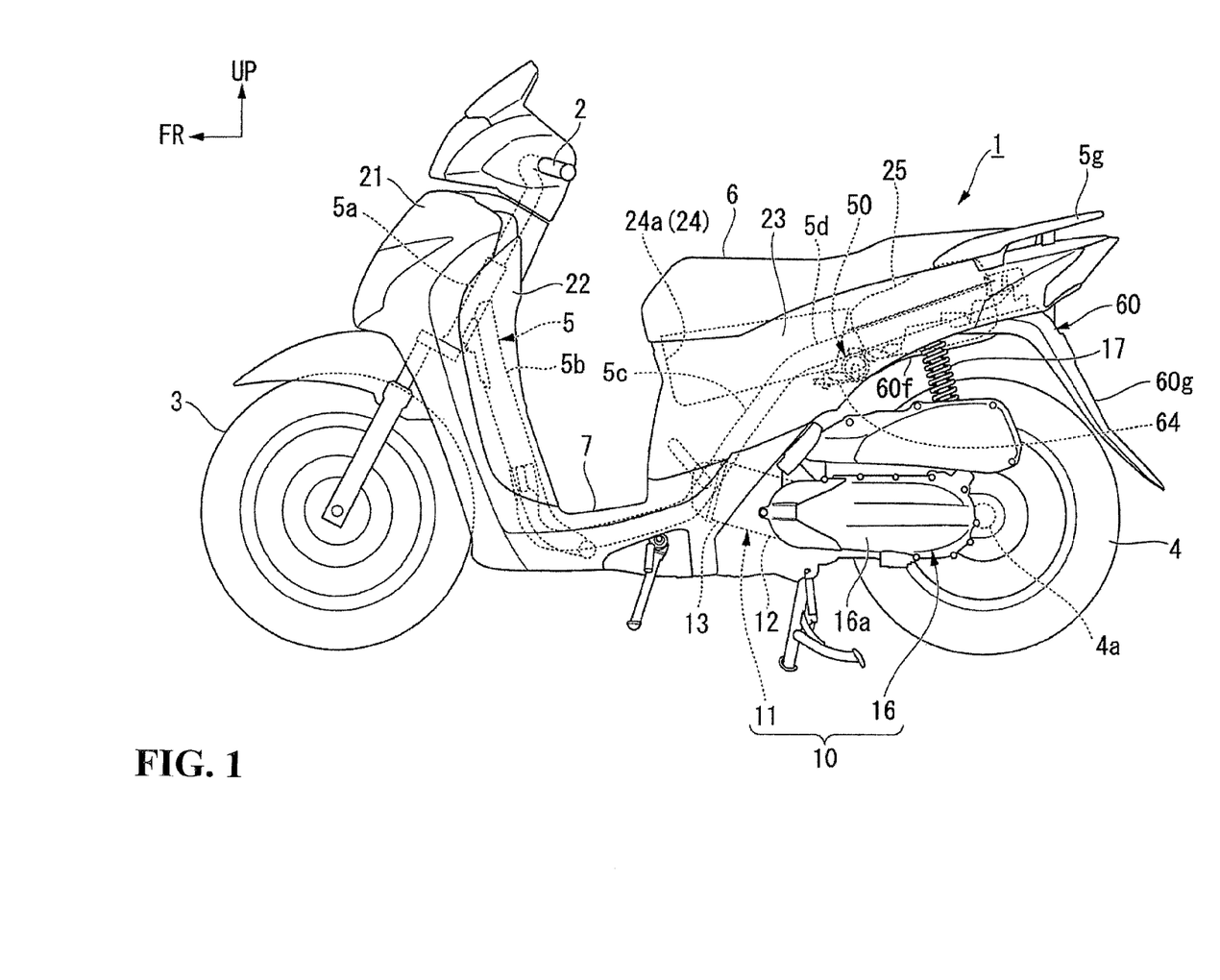
FIG. 1 is a left side view of the motorcycle according to the embodiment of the present invention.

A scooter type motorcycle (straddle type vehicle) 1 shown in FIG. 1 has a front wheel 3 steered by a steering handle 2, and a rear wheel 4 driven by a swing type power unit 10. Steering system components including the steering handle 2 and the front wheel 3 are pivotally supported so as to be steerable on a head pipe 5a of the front end of a body frame 5. The front lower side of the power unit 10 is pivotally supported on the lower rear side of the body frame 5 vertically and swingably. The space between the steering handle 2 and a seat 6 for a driver to be seated which is supported on the rear portion of the vehicle body is formed as a lower portion. A floor step 7 for putting a driver's feet is provided on the lower portion.

The body frame 5 is integrally jointed by welding and the like with a plurality of kinds of steels. The body frame has the head pipe 5a positioned on the front end portion of the body frame, a single main frame 5b extended obliquely downwardly from the head pipe 5a to the rear direction and then curved and extending in the rear direction at the front lower side of the vehicle body, right and left rear lower frames 5c standing upwardly from the rear end portion of the main frame 5b, and right and left rear frames 5d extending obliquely upwardly to the front direction from the upper end portion of the right and left rear lower frames 5c.

The front lower side of the power unit 10 is vertically and swingably supported on the rear end portion of the main frame 5b through a suspension link (not shown).

The power unit 10 is a swing type power unit integrated with an engine 11 configuring the front portion of the power unit and a transmission device 16 configuring the rear left side of the power unit. A rear suspension 17 is interposed between the rear portion of the transmission system 16 and the rear portion of the body frame 5. Accordingly, these components configure a unit swing type rear suspension structure on the rear portion of the vehicle body.

The engine (internal combustion engine) 11 is a single cylinder engine in which a crank shaft is disposed along the right and left direction (the width direction of the vehicle body). A cylinder 13 is projected from the front end portion of a crank case 12 to the front direction so as to be substantially horizontal (more specifically, so as to be slightly inclined upwardly to the front direction).

A piston is reciprocatably fitted into the cylinder 13. The reciprocation of the piston is converted into the rotational motion of the crank shaft through a connecting rod (none of these members is shown).

The front portion of a transmission case 16a extending in the rearward direction in the transmission system 16 is integrally provided on the left side of the crank case 12. A rear wheel shaft 4a projecting to the right direction (the center side of the vehicle body) of the transmission case is rotatably supported on the rear end portion of the transmission case 16a. The rotation power of the crank shaft is transmitted to the rear wheel shaft 4a through a transmission mechanism inside the transmission case 16. Accordingly, the rear wheel 4 supported by the rear wheel shaft 4a drives the motorcycle 1 to operate the vehicle.

The motorcycle 1 has a front cover 21 covering the front portion of the body frame 5 from the front direction and from outside of both obliquely front and right-left sides, an inner cover 22 covering the front portion of the body frame 5 from the rear direction, the above-mentioned floor step 7 covering the lower portion of the body frame 5 from above, a frame body cover 23 covering the rear portion of the body frame 5 from the front, side, and rear directions.

The seat 6 is supported above the frame body cover 23. In the space surrounded with the frame body cover 23 and the seat 6 between the right and left rear frames 5d, a luggage box 24 is provided for storing articles such as helmet. A fuel tank 25 is positioned behind the seat 6. A rear grip 5g supported on the rear end portion of the right and left rear frames 5d is disposed behind the seat 6.

Figure 2:
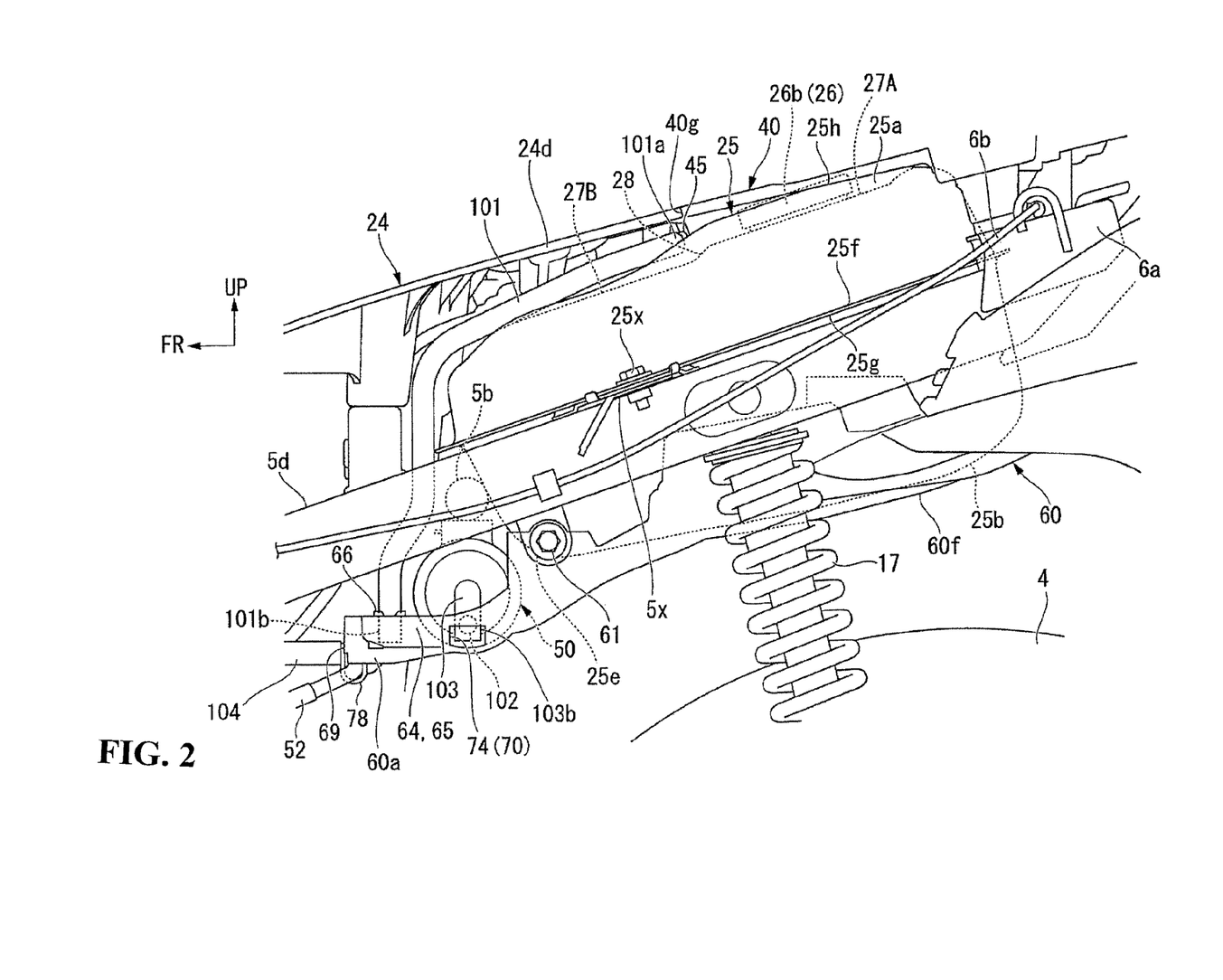
FIG. 2 is a left side view in the periphery of the fuel tank of the above-mentioned motorcycle.
Figure 3:
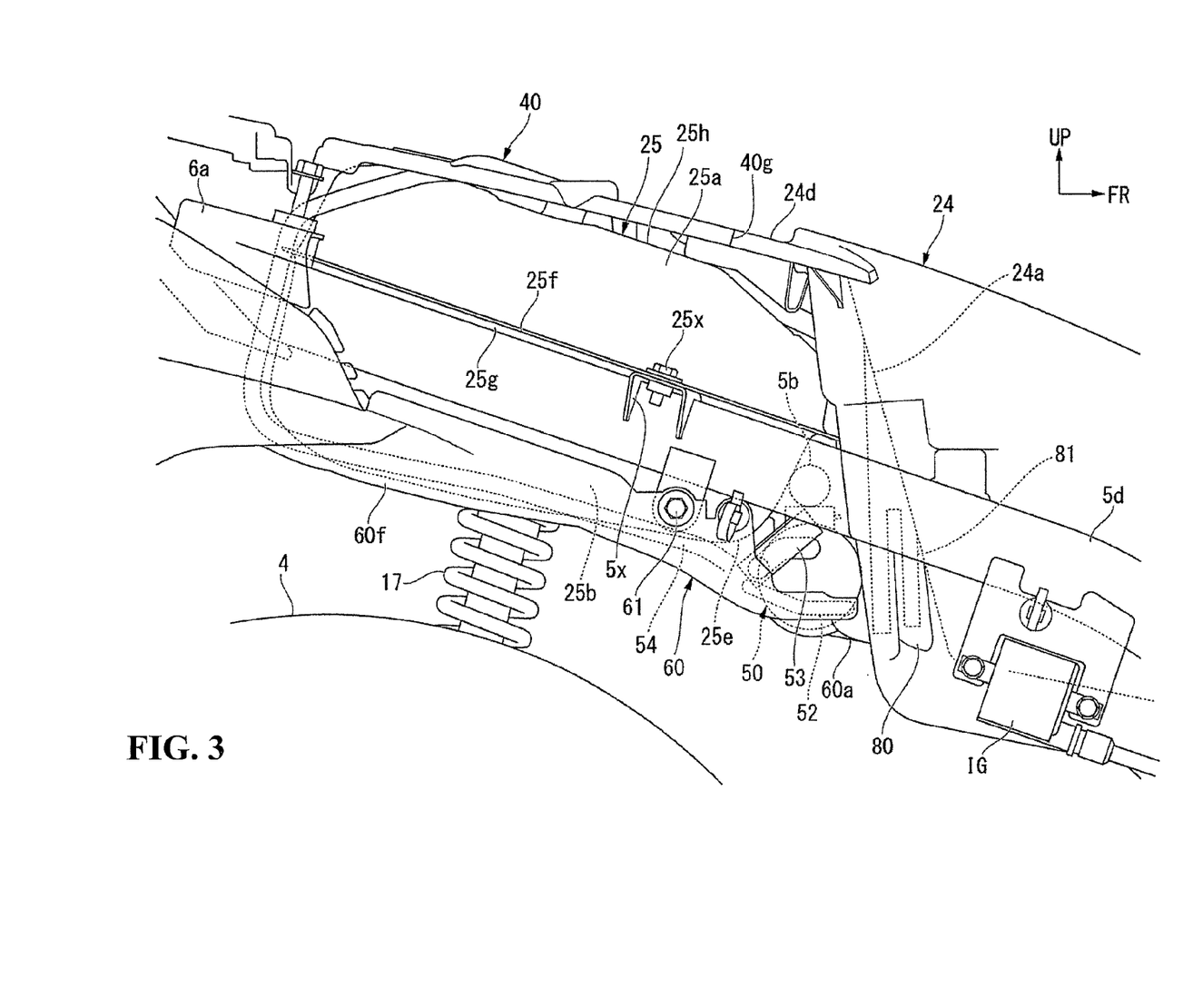
FIG. 3 is a right side view in the periphery of the fuel tank of the above-mentioned motorcycle.
Figure 4:
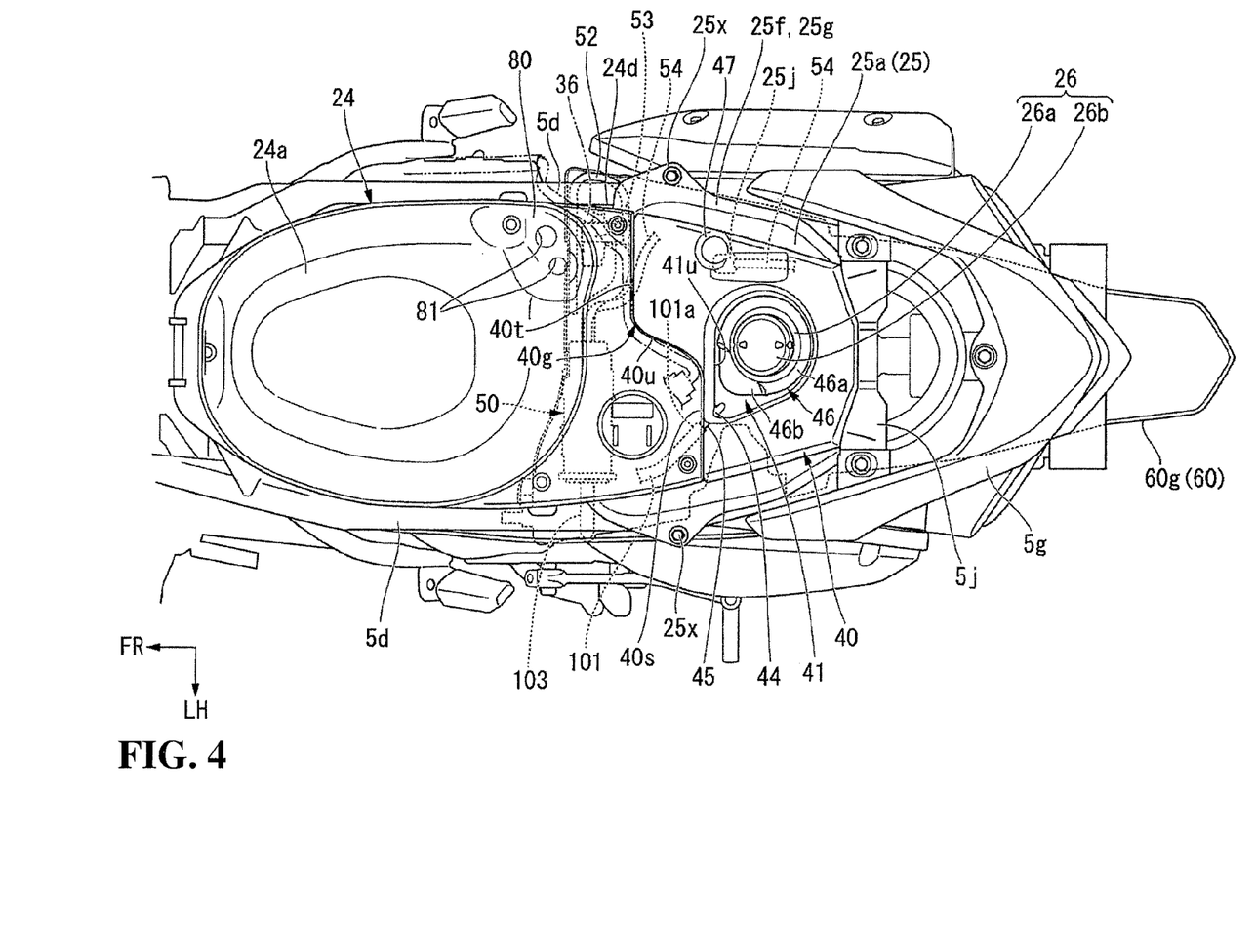
FIG. 4 is a plan view in the periphery of the fuel tank of the above-mentioned motorcycle.

As shown in FIGS. 2 and 3, the fuel tank 25 has a steel plate upper half body 25a formed in a upward convex shape and a steel plate lower half body 25b formed in a downward convex shape. The defined inner space of the fuel tank is configured with an upper flange portion 25f of the upper half body 25a and a lower flange portion 25g of the lower half body 25b so as to be joined by welding. As illustrated in FIG. 4, the fuel tank 25 is configured such that parts of the upper flange portion 25f and the lower flange portion 25g project to the outer peripheral sides. The fuel tank is fastened and fixed on a bracket 5x provided on the right and left rear frames 5d with bolts 25x. A seat lock mechanism 6a is positioned behind the fuel tank 25. A seat lock cable 6b extends from the seat lock mechanism 6a to a locking operation portion disposed on the front portion of the vehicle. An ignition coil IG is disposed in the right direction of the luggage box 24.

Figure 5:
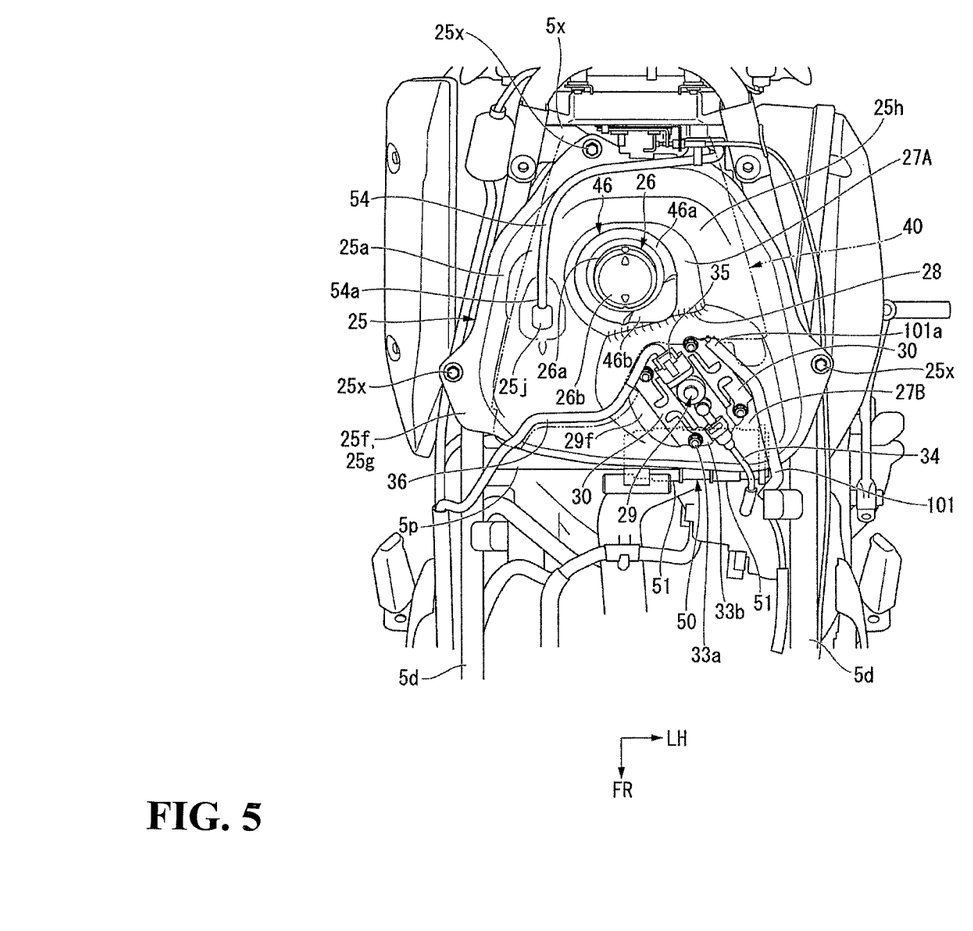
FIG. 5 is a plan view showing the state that the tank cover and the luggage box are detached from the state in FIG. 4.

As shown in FIGS. 2, 3, and 5, an upper surface 25h inclined downwardly in the forward direction like the right and left rear frames 5d is formed on the upper half body 25a of the fuel tank 25. The fuel filler opening 26 is provided on the horizontally center of the rear portion of the upper surface. The fuel filler opening 26 has a cylindrical fuel supply pipe portion 26a vertically penetrating the inside and outside of the fuel tank 25. A fuel cap 26b is attached on an upper portion opening of a fuel supply cylinder portion 26a so as to be removable.

The periphery of the fuel supply cylinder portion 26a of the fuel filler opening 26 on the upper half body 25a of the fuel tank 25 is displaced downwardly relative to the upper surface 25h and forms a first inclined surface 27A inclined downwardly in the forward direction. A second inclined surface (downward displaced portion) 27B lowered furthermore relative to the first inclined surface 27A through a stepped portion 28 is formed so as to be inclined downwardly in the forward direction in the front left side of the upper half body 25a of the fuel tank 25.

Figure 7:
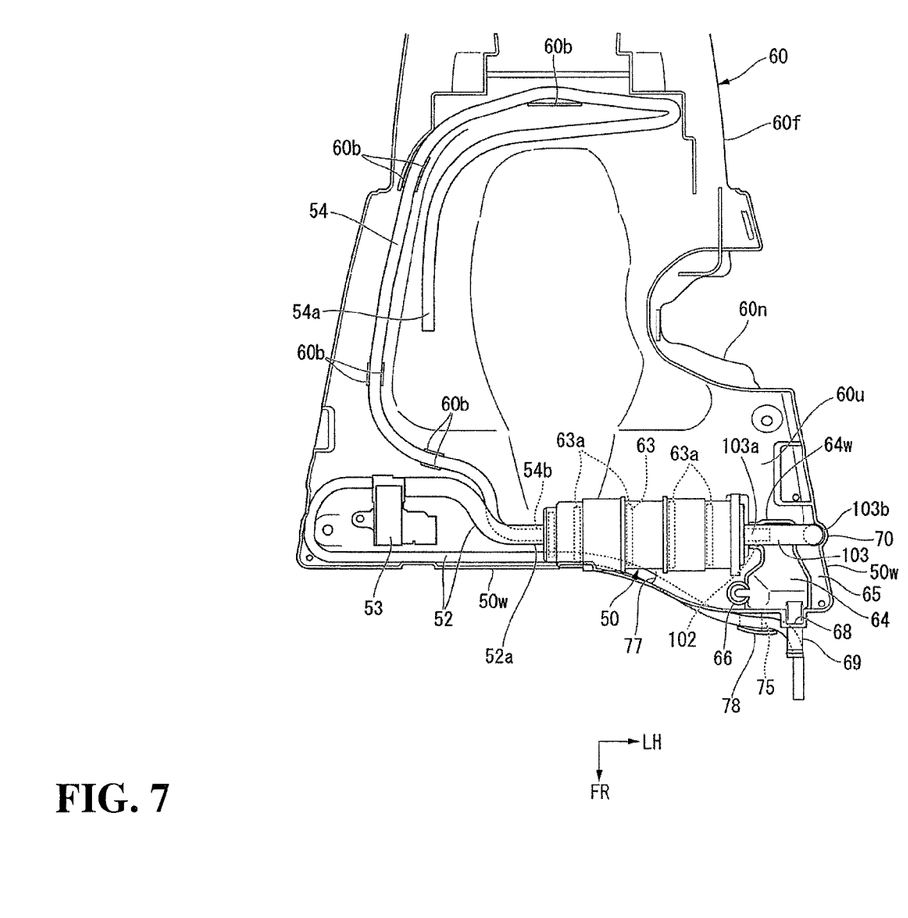
FIG. 7 is a plan view of the front portion of the rear fender of the above-mentioned motorcycle.

A charge connection portion 25j is provided in the right direction of the first inclined surface 27A of the fuel tank 25 so as to connect an one end portion 54a of a charge hose 54 reaching to a canister 50 described below. The charge hose 54 is guided in the rear direction of the fuel tank 25 and is positioned along the upper flange portion 25f of the upper half body 25a to the left direction of the vehicle body, so as to be passed through the clearance gap between the fuel tank 25 and the left rear frame 5d to the lower side of the fuel tank 25. With reference to FIG. 7, the charge hose 54 is positioned on the lower side of the fuel tank 25 turns again in the right direction of the vehicle body above a rear fender 60 and curves to the front direction, and is connected to the right end portion of the canister 50. A plurality of hose guides 60b guiding the positioning of the charge hose 54 is mounted on the rear fender 60.

Figure 6:
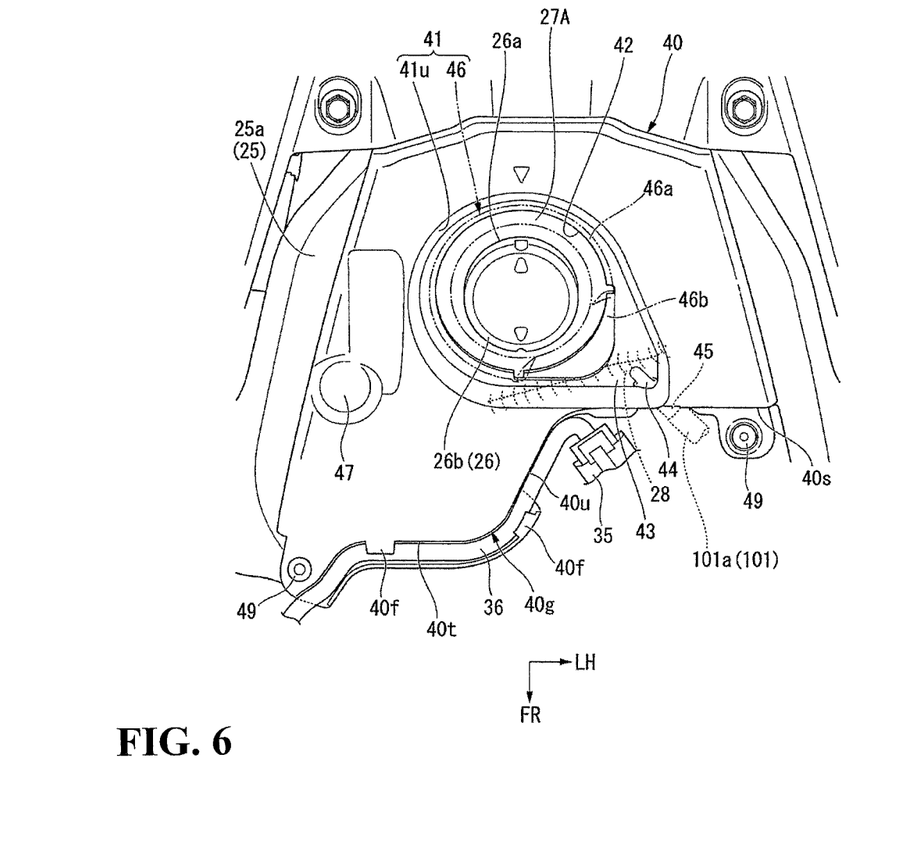
FIG. 6 is a plan view of the first tray portion provided on the above-mentioned tank cover.

As shown in FIGS. 4 and 6, a tank cover 40 is provided so as to cover the portion behind the stepped portion 28 in the upper surface side of the fuel tank 25. The tank cover 40 has a recessed portion 41u recessed downward so as to fit the first inclined surface 27A in the periphery of the fuel filler opening 26. The recessed portion 41u and a seal member 46 described below form a first tray portion 41. The tank cover 40 forms an opening portion 42 with a larger inner diameter than an outer diameter of the fuel supply cylinder portion 26a of the fuel filler opening 26, the fuel supply cylinder portion 26a is exposed on the tank cover 40 through the opening portion 42. A part of the first inclined surface 27A positioned in the outer peripheral side of the fuel supply pipe portion 26a is exposed to the inner circumference side of the opening portion 42. A convex portion 47 covering the portion connecting the charge connection portion 25j of the fuel tank 25 and the charge hose 54 is formed on the tank cover 40.

A front edge portion 40g of the tank cover 40 has right and left side portions 40s, 40t along the right and left direction, an inclined portion 40u extending between the inner end portions of the right and left side portions 40s, 40t, and formed in a crank shape in a plane view. The left side portion 40s is displaced to the rear relative to the right side portion 40t so as to avoid the second inclined surface 27B of the fuel tank 25. The inclined portion 40u is formed so as to be inclined and positioned in a further right side as it approaches to the front side.

An extended portion 43 extends to the front direction and to the left direction of the vehicle body in the outer peripheral side of the opening portion 42 on the recessed portion 41u of the first tray portion 41. A drain hole 44 is formed on a corner portion (a lowest end portion) formed by the extended portion 43 on its front and left direction.

A nozzle-shaped first drain connection port (first drain portion) 45 projecting from the periphery of the drain hole 44 to the obliquely downward to the front direction is formed on the lower surface of the tank cover 40. The first drain connection port 45 is formed so as to be inclined downwardly to the front direction along an inclination of the stepped portion 28, and faces on the second inclined surface 27B. A base end portion 101a of a first drain pipe (hose) 101 is connected to the first drain connection port 45. With reference to FIGS. 2 and 5, the first drain pipe 101 is positioned obliquely downwardly to the front direction along the second inclined surface 27B.

As shown in FIGS. 5 and 6, an annular seal member 46 is attached on the outer peripheral portion of the fuel supply cylinder portion 26a of the fuel filler opening 26. The seal member 46 seals the space between the opening portion 42 of the tank cover 40 and the fuel supply cylinder portion 26a of the fuel filler opening 26. The first tray portion 41 is configured with the recessed portion 41u having the seal members 46.

The seal members 46 has a peripheral wall portion 46a which becomes gradually higher as it approaches to the outer peripheral portion from the inner circumference portion. The peripheral wall portion 46a forms a notch portion 46b in the area facing to the extended portion 43 at a part of the circumference direction. The fuel spilt from the fuel filler opening 26 is received on a gutter shaped portion formed between the peripheral wall portion 46a and the fuel supply cylinder portion 26a and guided to the drain hole 44 side by the notch portion 46b through the extended portion 43.

As shown in FIGS. 3 and 4, a rear extended portion 24d extending to the rear direction is formed on the upper end portion of the rear portion of the luggage box 24. The rear extended portion 24d is provided so as to match the rear edge portion thereof with the crank shaped front edge portion 40g of the tank cover 40. The rear extended portion 24d abuts on the front edge portion 40g of the tank cover 40, and forms the continuous surface to the tank cover 40. Simultaneously, the rear extended portion is provided so as to cover the second inclined surface 27B exposing the upper portion of a fuel pump 29.

As shown in FIG. 5, the fuel pump 29 is supported on the second inclined surface 27B of the fuel tank 25. The fuel pump 29 has a cylindrical pump main body (not shown) faced to the inside of the fuel tank 25 and a flange portion 29f formed by enlarging the diameter on the upper portion of the pump main body. The fuel pump 29 inserts the pump main body into the fuel tank 25 from a pump insertion hole (not shown) formed on the second inclined surface 27B. The fuel pump is supported by engaging the flange portion 29f from above with the second inclined surface 27B in the periphery of the pump insertion hole.

A pair of set plates 30 sandwich the flange portion 29f with the second inclined surface 27B so as to fix the fuel pump 29. Each set plate 30 sandwiches the flange portion 29f of the fuel pump 29 with the second inclined surface 27B, by penetrating stud bolts 33a provided on the fuel tank 25 into a bolt insertion hole (not shown) and by screwing and fastening each stud bolt 33a into each nut 33b.

One end portion of a fuel feeding pipe 34 extends downwardly in the left direction along the second inclined surface 27B of the fuel tank 25 and is connected to the upper portion of the fuel pump 29. The fuel feeding pipe 34 discharges the fuel compressed and fed by the fuel pump 29 to the outer side in the radial direction of the fuel pump 29. The fuel feeding pipe 34 is connected to a fuel supply device (not shown) such as an injector supplying the fuel inside the cylinder 13 of the engine 11.

A coupler 35 which can connect a connector from the opposite direction to the connecting direction of the fuel feeding pipe 34 is provided on the upper portion of the fuel pump 29. A connecter of a harness 36 for the fuel pump, which transmits the signal controlling the operation of the fuel pump 29, is connected to the coupler 35 so as to be freely insertable or removable.

With also reference to FIG. 6, the harness 36 is held by a plurality of harness hooks (guide portions) 40f provided along the front edge portion 40g of the tank cover 40. Accordingly, the harness is guided in the right direction of the vehicle body along the front edge portion 40g of the tank cover 40. The other end portion of the harness 36 is connected to a main harness (not shown).

As shown in FIG. 6, the tank cover 40 is configured such that the both right and left sides of the front end portion thereof are fastened by a fixing metal 49 to the rear end portion of the rear extended portion 24d of the luggage box 24. The front edge portion 40g of the tank cover 40 is disposed on the rear end portion of the rear extended portion 24d of the luggage box 24 so as to be covered. Accordingly, the harness hook (guide portion) 40f has a configuration with an enhanced external appearance and without the exposure to the outside (See FIG. 2). The tank cover 40 is configured such that the rear end portion thereof is fastened with bolts (not shown) and the like to a connection plate 5j (see FIG. 4) connecting the right and left rear frames 5d each other.

As shown in FIGS. 3 and 4, the luggage box 24 has a housing recessed portion (article storage portion) 24a which is disposed in front of the fuel tank 25 for housing a helmet and the like. The housing recessed portion 24a forms a tool holding portion 80 into which tools including a screwdriver can be inserted in the right side of the rear end portion inside the luggage box. The tool holding portion 80 is provided so as to project towards the rear by avoiding the canister 50 described below. A plurality of insertion recessed portions 81 of the tool holding portion 80 are opened upwardly and corresponding to a shape of the tip portion of the tool. The tip portions of the tools are inserted from above to each insertion recessed portions 81, respectively. Accordingly, the tool can be held at a predetermined position inside the luggage box 24. The insertion recessed portions 81 are formed corresponding to a type of on-vehicle tool in shape, scale, and number. The tool holding portion 80 is provided on any one of right and left corner portions on the rear end portion of the housing recessed portion 24. Accordingly, the tool holding portion hardly interferes with the housing recessed portion when storing articles such as helmets inside the housing recessed portion 24a, simultaneously. Thus, an increase in the actual capacity of the luggage box 24 is achieved by efficiently using the space of the corner portion.

As shown in FIGS. 2 to 5, the canister 50 is disposed in the front and lower direction of the fuel tank 25 and behind the housing recessed portion 24a of the luggage box 24 (namely, between the fuel tank 25 and the housing recessed portion 24a).

The canister 50 can absorb the evaporated fuel by using an absorbent such as activated carbon incorporated therein that has a cylindrical external appearance. The canister is configured so as to align the central axis direction with the width direction of the vehicle body. The canister 50 is supported in the vicinity of the front end portion of the fuel tank 25, by engaging a pair of rubber band 51, as an example, wound around on the outer surface of the canister 50 with a connection pipe 5p bridging between the right and left rear frames 5d. The canister 50 is configured such that at least a part thereof is disposed below the fuel tank 25.

Figure 8:
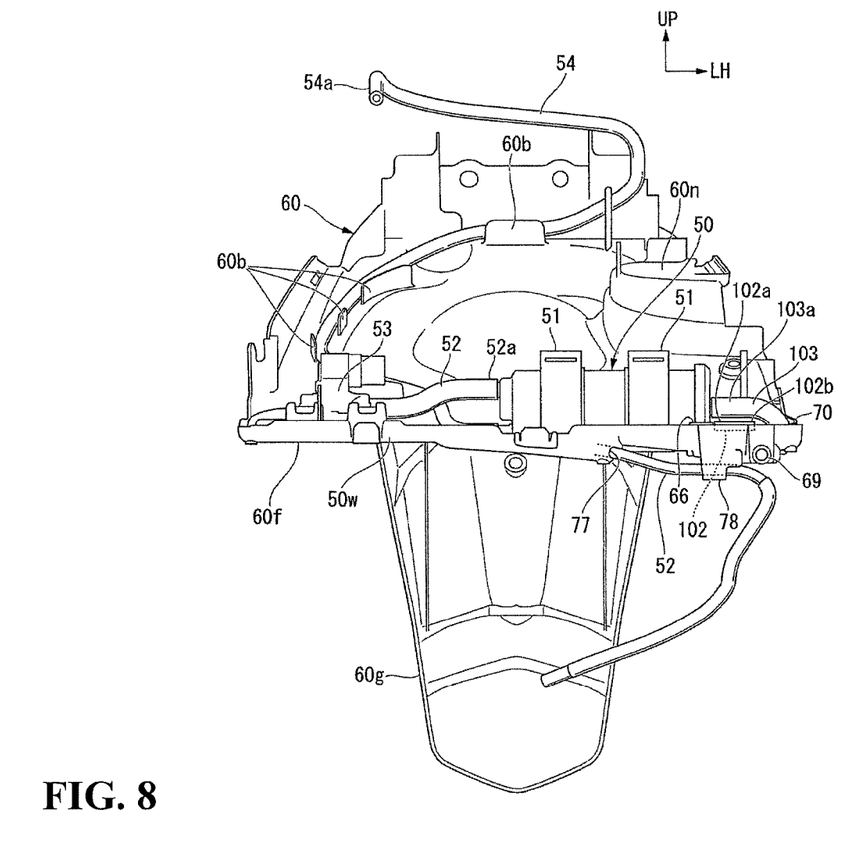
FIG. 8 is a front view of the above-mentioned rear fender.

As shown in FIGS. 7 and 8, the canister 50 is configured such that a base end portion 52a of a purge hose 52 for supplying the evaporated fuel to the inlet system, simultaneously, and a tip portion 54b of the charge hose 54 for introducing the evaporated fuel from the fuel tank 25, are connected to the one end portion (right end portion) facing to the right direction of the vehicle body.

The purge hose 52 connects the other end portion thereof to the inlet pipe as an example in an engine inlet system (not shown). A purge control valve (hereinafter, shown as a PCV) 53 is provided on the middle portion of the purge hose 52. The PCV 53 is disposed in the right direction of the canister 50. The PCV 53 opens and closes a channel of the purge hose 52 by operating a solenoid responding to a command from the control device disposed at the appropriate position of the vehicle, which enables to introduce the evaporated fuel from the canister 50 to the engine inlet system side. In the motorcycle 1, the PVC 53 can adjust the return flow of the evaporated fuel amount to the inlet system by opening and closing. The return flow of the evaporated fuel can be adjusted in the increase and decrease by changing the intervals of the opening and closing of the solenoid corresponding to the engine rotating speed as an example.

The canister 50 is configured such that a base end portion 102a of a second drain pipe (nozzle) 102, simultaneously, and a base end portion 103a of an air introduction pipe (hose) 103 are connected to the other end portion (left end portion) facing to the left direction of the vehicle body.

The second drain pipe 102 can discharge the fuel and water drops and the like which are stored inside thereof, and the air introduction pipe 103 can introduce the air into the canister 50. The present embodiment may be configured such that the second drain pipe 102 has only a nozzle projected on the left end portion of the canister 50. A hose and the like may be connected separately.

As shown in FIGS. 2 and 3, the rear fender 60 for receiving mud and water splashed from the rear wheel 4 is attached to the right and left rear frames 5d below the above-mentioned fuel tank 25 with bolts 61 and the like.

As shown in FIG. 1, the rear fender 60 integrally has an upper mudguard surface 60f covering the lower direction of the fuel tank 25 between the right and left rear frames 5d and a rear mudguard surface 60g extending obliquely downwardly from the rear end portion of the right and left rear frames 5d to the lower direction for receiving mud and water splashing from the rear wheel 4 to the rear direction from the rear wheel 4. As shown in FIGS. 7 and 8, a clearance recessed portion 60n penetrating the rear suspension 17 is formed in the left side of the upper mudguard surface 60f of the rear fender 60.

As shown in FIGS. 2 and 3, a front end portion 60a of the rear fender 60 is disposed so as to extend further obliquely downwardly in a forward direction than the front lower end portion 25e of the fuel tank 25.

As shown in FIGS. 7 to 10, a canister supporting portion 63 is provided for supporting the lower surface side of the canister 50 with a second tray portion 64 being formed adjacent thereto to the left direction of the canister supporting portion 63. An atmosphere opening tray portion 65 is formed adjacent thereto to the left direction of the second tray portion 64 on the front end portion 60a of the rear fender 60.

The canister supporting portion 63 has a plurality of ribs 63a in an arc shape along the outer peripheral surface of the cylindrical canister 50 horizontally spaced apart from each other. The canister 50 is mounted so as to be supported on the plurality of ribs 63a.

The second tray portion 64 is disposed in front of the fuel tank 25 and behind the tool holding portion 80. The second tray portion 64 is formed so as to be surrounded with a wall portion 64w standing upwardly from an upper surface 60u of the rear fender 60. A first drain pipe connection portion (connection portion) 66 to which a tip portion 101b of the first drain pipe 101 is connected and a second drain pipe connection portion 67 to which a tip portion 102b of the second drain pipe 102 is connected are formed on the part of the wall portion 64w.

Figure 9:
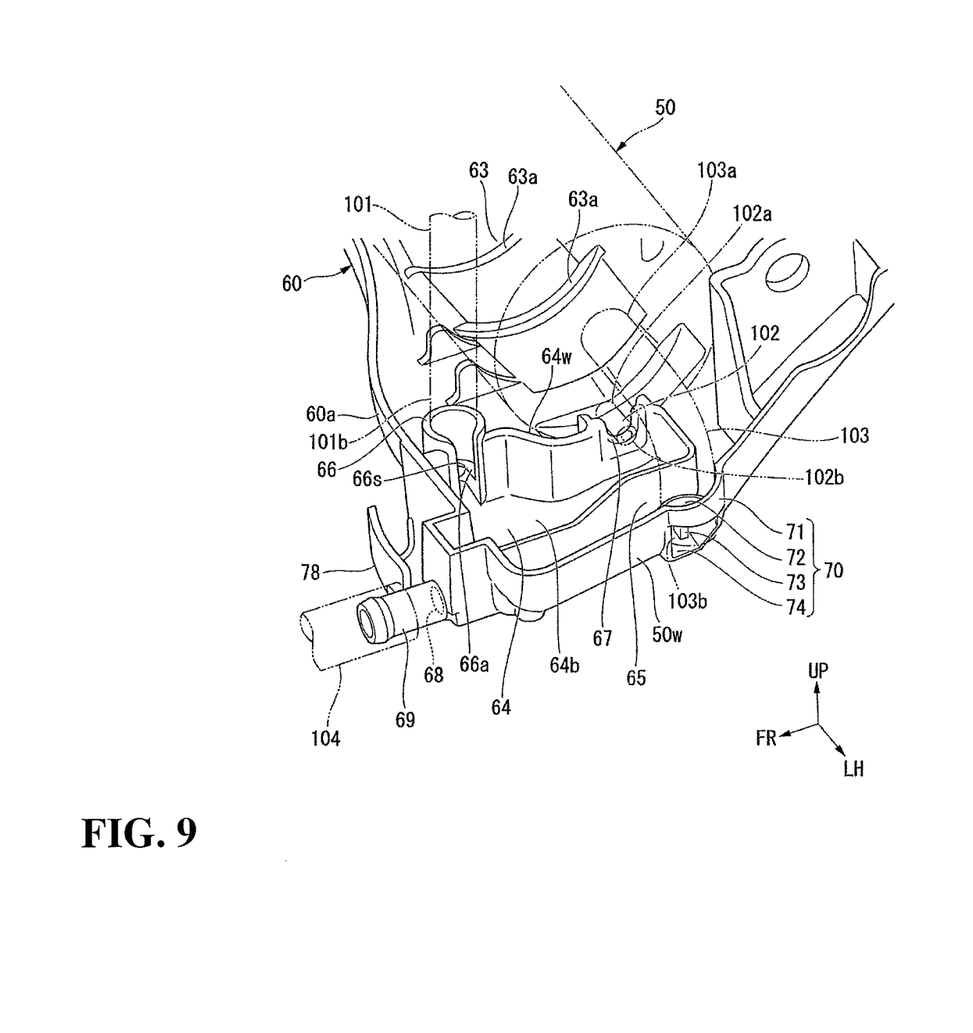
FIG. 9 is a perspective view of the second tray portion provided on the above-mentioned rear fender.
Figure 10:
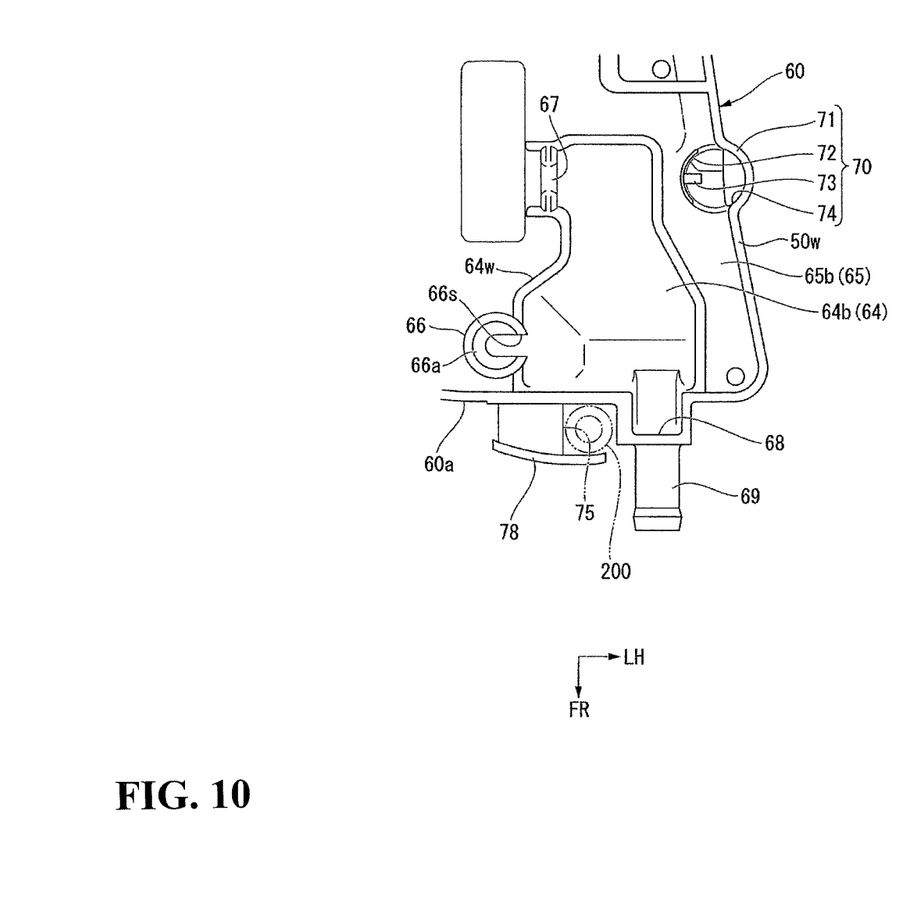
FIG. 10 is a plan view of the above-mentioned second tray portion.

The first drain pipe connection portion 66 is formed in a cylindrical shape so as to stand upward from the upper surface 60u of the rear fender 60. A slit 66s is formed vertically and continuously on a part of the circumferential direction. The inner diameter of the first drain pipe connection portion 66 is approximately the same as the outer diameter of the first drain pipe 101. A stopper portion 66a in a C shape in a plane view is formed on the lower end portion of the first drain pipe connection portion 66 such that the inner diameter of the stopper portion is smaller than the outer diameter of the first drain pipe 101 and is larger than the inner diameter of the first drain pipe 101.

The tip portion 101b of the first drain pipe 101 is inserted into the first drain pipe connection portion 66. The tip portion 101b abuts on the stopper portion 66a. In this state, fuel is overflowed from the tip portion 101b of the first drain pipe 101 to the periphery of the fuel filler opening 26 of the fuel tank 25. The fuel flows into the second tray portion 64 through the lower portion of the slit 66s.

The upper end portion of the wall portion 64w is notched in an approximately U-shape. The notched portion forms the second drain pipe connection portion 67. The tip portion 102b of the second drain pipe 102 is inserted into, connected to, and supported on the second drain pipe connection portion 67 from above. In this state, the drain liquid from the canister 50 flows from the tip portion 102b of the second drain pipe 102 into the second tray portion 64.

The second drain hole 68 is formed on the front end portion of the second tray portion 64. A bottom surface 64b (which is also the upper surface 60u of the rear fender 60) of the second tray portion 64 is inclined downwardly in the forward direction. A second drain hole 68 is formed on the lowest end portion of the bottom surface 64b. A nozzle shaped second drain connection port (second drain portion) 69 projecting obliquely downwardly from the periphery of the second drain hole 68 to the front direction is formed on the front end portion of the rear fender 60. A third drain pipe (hose) 104 is connected to the second drain connection port 69. The third drain pipe 104 is positioned to the lower end portion of the vehicle body. A tip portion (not shown) of the third drain pipe is opened to the lower direction of the vehicle body.

The atmosphere opening tray portion 65 is formed between a peripheral wall portion 50w formed so as to stand upward from the outer peripheral edge portion of the rear fender 60 and the wall portion 64w of the second tray portion 64. An air introduction pipe connection portion 70, to which a tip portion 103b of the air introduction pipe 103 is connected, is formed on the atmosphere opening tray portion 65.

The air introduction pipe connection portion 70 has a guide portion 71 formed on a part of the peripheral wall portion 50w of the rear fender 60 so as to be curved along the outer peripheral surface of the air introduction pipe 103, and to project outwardly. A guide wall 72 standing upward from a bottom surface 65b (which is also the upper surface 60u of the rear fender 60) of the atmosphere opening tray portion 65 inside the guide portion 71 is formed so as to be curved along the outer peripheral surface of the air introduction pipe 103. A stopper portion 73 abuts on the tip of the air introduction pipe 103 upwardly projecting from the bottom surface 65b of the atmosphere opening tray portion 65 below the guide wall 72. An air inlet opening 74 is formed so as to notch the lower direction of the guide portion 71 in the peripheral wall portion 50w.

The tip portion 103b of the air introduction pipe 103 is inserted and sandwiched between the guide portion 71 and the guide wall 72.

The air introduction pipe 103 is configured such that the tip thereof abuts on the stopper portion 73. Accordingly, the air introduction pipe is opposed to the bottom surface 65b of the atmosphere opening tray portion 65 with clearance. Therefore, the air introduction pipe 103 can suck the air from an air inlet opening 74 through the clearance between the bottom surface 65b of the atmosphere opening tray portion 65 and the tip portion 103b of the air introduction pipe 103.

The purge hose 52 passing through the PCV 53 from the canister 50 turns in the forward direction in the right side of the rear fender 60, and is disposed along the inner side of the peripheral wall portion 50w of the front end portion of the rear fender 60.

The purge hose 52 is guided to the outside of the rear fender 60 through an insertion hole 77 formed on the front end portion of the rear fender 60. The purge hose 52 is held outside the rear fender 60 by a guide hook 78 formed in an approximately U-shape in a cross section and formed in the vicinity of the second drain connection port 69. The purge hose 52 is curved to the front direction in the right direction of the guide hook 78, and is guided and connected to an inlet system (not shown).

With reference to FIG. 10, a hold recessed portion 75 which can hold a drain pipe (hose) 200 by vertically penetrating the hold recessed portion is formed on the guide hook 78. More specifically, in the motorcycle 1 without the canister 50, when the drain pipe 200 is, guided from the fuel tank 25 to the lower direction of the vehicle body, the holding recessed portion 75 can hold the drain pipe 200. Accordingly, the vehicle without the canister can use the rear fender 60 without providing the new rear fender, which improves general versatility of the rear fender 60. Accordingly, the rear fender 60 can be mass-produced. Thus, a reduction in cost is achieved.

As mentioned above, in the present embodiment, the fuel tank 40 covering the upper side surface side of the fuel tank 25 forms the first tray portion 41 in a recessed shape in the periphery of the fuel filler opening 26 of the fuel tank 25. The first tray portion 41 has the first drain portion 45 to which the base end portion 101a of the first drain pipe 101 is connected. The rear fender 60 forms the second tray portion 64 in a recessed shape to which the tip portion 101b of the first drain pipe 101 and the tip portion 102b of the second drain pipe 102 connected to the base end portion 102a are connected to the canister 50. The second tray portion 64 has the second drain portion 69 discharging the liquid.

According to the configuration, the first drain pipe 101 extending from the tank cover 40 and the second drain pipe 102 extending from the canister 50 are connected to the second tray portion 64 of the rear fender 60. Accordingly, the fuel filler opening 26 and the canister 50 are spaced apart from each other. As a result, the influence on the capacity of the fuel tank 25 due to the arrangement of the canister 50 can be reduced. Then, just a single drain pipe is enough to drain the excess fuel from the second tray portion 64, which can suppress complication of the positioning of drain pipe 200 even if the fuel tank 25 has the first drain connection port 45, and the canister 50 has the second drain connection port 69, respectively.

Moreover, in the present embodiment, the first drain pipe 101 does not feed the excess liquid to the canister 50. Accordingly, the canister 50 can suck air from the outside without vapor. Thus, the canister 50 can efficiently separate the absorbed fuel.

Moreover, in the present embodiment, the first tray portion 41 is disposed on the upper surface side of the fuel tank 25, and the second tray portion 64 is disposed below the fuel tank 25. Accordingly, the excess liquid can efficiently join to the second tray portion 64, even if the first tray portion 41 and the second tray portion 64 are provided respectively above and below the fuel tank 25. Then, the first tray portion 41 and the second tray portion 64 are disposed above and below the fuel tank 25, which can reduce the influence on the capacity of the fuel tank 25 due to the first tray portion 41 and the second tray portion 64.

Moreover, in the present embodiment, the stepped portion 28, which forms the second inclined surface 27B with the upper surface height lowered relative to the periphery of the fuel filler opening 26, is formed on the front portion of the fuel tank 25. The first drain connection port 45 is formed so as to be inclined downward to the front direction along the stepped portion 28. Accordingly, the first drain connection port 45 inclined downward to the front direction can be easily disposed by using the stepped portion 28. Simultaneously, the excess fuel from the fuel filler opening 26 can be discharged satisfactorily from the first drain connection port 45 due to the fact that the first drain connection port 45 inclines downward to the front direction.

Moreover, in the present embodiment, the fuel pump 29 is supported on the second inclined surface 27B. The tank cover 40 has the harness hook 40f guiding the harness 36 connected to the fuel pump 29, which can simplify the positioning structure of the harness 36 connected to the fuel pump 29.

Moreover, in the present embodiment, the canister 50 is disposed in the front and lower direction of the fuel tank 25, the second tray portion 64 has the first drain pipe connection portion 66 to which the first drain pipe 101 is connected in front of the canister 50. Accordingly, the first drain pipe 101 is connected to the second tray portion 64 in the front side by avoiding the canister 50 and the fuel tank 25. Thus, the connection of the first drain pipe can be simplified.

Moreover, in the present embodiment, the rear fender 60 can support the canister 50, the charge hose 54 introducing the evaporated fuel from the fuel tank 25, the supply purge hose 52 supplying the evaporated fuel from the canister 50 to the inlet system, and the purge control valve 53 controlling the supply of the evaporated fuel in the purge hose 52. Accordingly, the canister 50, the charge hose 54, the purge hose 52, and the purge control valve 53 are installed on the rear fender 60 in advance. Thus, these components can be attached to the vehicle body as a unit, which can improve the efficiency of the assembly operation of the vehicle body.

Moreover, in the present embodiment, the housing recessed portion 24a of the luggage box 24 is provided in front of the fuel tank 25. The canister 50 is disposed between the housing recessed portion 24a and the fuel tank 25. Accordingly, the space between the housing recessed portion 24a and the fuel tank 25 can be efficiently used as an installation space for the canister 50, which can reduce the influence on the capacity of the fuel tank 25 due to the canister.

Furthermore, the present invention is not limited to the above-mentioned embodiment with reference to the drawings, and various variations can be possible within the technical scope.

For example, various positioning routes of pipes and the various layouts of components can be available within the scope of the present invention.

Moreover, the straddle type vehicle includes general vehicles such that a driver straddles the vehicle body for riding, not only motorcycles (such as motor-bicycles and scooter type vehicles) but also includes three-wheeled vehicles (such as a vehicle with one front wheel and two rear wheels and a vehicle with two front wheels and one rear wheel) or four-wheeled vehicles.

The configuration of the above-mentioned embodiment is an example of the present invention. Various changes can be available within the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A straddle vehicle comprising:
   a rear frame forming a rear portion of a body frame;
   a rear fender attached to said rear frame;
   a fuel tank supported on said rear frame above said rear fender;
   a canister having at least a part thereof being disposed below said fuel tank above said rear fender; and
   a tank cover covering the upper surface side of said fuel tank;
   said tank cover forms a first tray portion in a recessed shape in a periphery of a fuel filler opening of said fuel tank, said first tray portion has a first drain portion to which a base end portion of a first drain pipe is connected;

said rear fender forms a second tray portion in a recessed shape to which a tip portion of said first drain pipe and a tip portion of a second drain pipe connected to a base end portion which is connected to said canister, and said second tray portion has a second drain portion for discharging the liquid.

2. The straddle vehicle according to claim 1, wherein said first tray portion is disposed on the upper surface side of said fuel tank, and said second tray portion is disposed below said fuel tank.

3. The straddle vehicle according to claim 2, wherein:
a stepped portion, which forms a downwardly displaced portion with the upper surface height lowered relative to the periphery of said fuel filler opening, is formed on the front portion of said fuel tank; and
said first drain portion is formed so as to be inclined downwardly to the front direction along said stepped portion.

4. The straddle vehicle according to claim 2, wherein:
said canister is disposed in the front and lower direction of said fuel tank; and
said second tray portion has a connecting portion to which said first drain pipe is connected in front of said canister.

5. The straddle vehicle according to claim 2, wherein said rear fender supports said canister and further including:
a charge hose for introducing the evaporated fuel from said fuel tank;
a purge hose for supplying said evaporated fuel from said canister to the inlet system; and
a purge control valve for controlling said evaporated fuel supply in said purge hose.

6. The straddle vehicle according to claim 2, and further including:
an article storage portion provided in front of said fuel tank; and
said canister is disposed between said article storage portion and said fuel tank.

7. The straddle vehicle according to claim 1, wherein:
a stepped portion, which forms a downwardly displaced portion with the upper surface height lowered relative to the periphery of said fuel filler opening, is formed on the front portion of said fuel tank; and
said first drain portion is formed so as to be inclined downwardly to the front direction along said stepped portion.

8. The straddle vehicle according to claim 7, wherein:
a fuel pump is supported on said downwardly displaced portion; and
said tank cover has a guide portion guiding a harness connected to said fuel pump.

9. The straddle vehicle according to claim 7, wherein:
said canister is disposed in the front and lower direction of said fuel tank; and
said second tray portion has a connecting portion to which said first drain pipe is connected in front of said canister.

10. The straddle vehicle according to claim 7, wherein said rear fender supports said canister and further including:
a charge hose for introducing the evaporated fuel from said fuel tank;
a purge hose for supplying said evaporated fuel from said canister to the inlet system; and
a purge control valve for controlling said evaporated fuel supply in said purge hose.

11. The straddle vehicle according to claim 7, and further including:
an article storage portion provided in front of said fuel tank; and
said canister is disposed between said article storage portion and said fuel tank.

12. The straddle vehicle according to claim 1, wherein:
said canister is disposed in the front and lower direction of said fuel tank; and
said second tray portion has a connecting portion to which said first drain pipe is connected in front of said canister.

13. The straddle vehicle according to claim 1, wherein said rear fender supports said canister and further including:
a charge hose for introducing the evaporated fuel from said fuel tank;
a purge hose for supplying said evaporated fuel from said canister to the inlet system; and
a purge control valve for controlling said evaporated fuel supply in said purge hose.

14. The straddle vehicle according to claim 1, and further including:
an article storage portion provided in front of said fuel tank; and
said canister is disposed between said article storage portion and said fuel tank.

15. In a straddle vehicle having a rear frame forming a rear portion of a body frame and a rear fender attached to said rear frame with a fuel tank supported on said rear frame above said rear fender and a canister having at least a part thereof being disposed below said fuel tank above said rear fender, comprising:
a tank cover covering the upper surface side of said fuel tank;
a first tray portion formed in the tank cover, said first tray portion having a recessed shape in a periphery of a fuel filler opening of said fuel tank, said first tray portion includes a first drain portion to which a base end portion of a first drain pipe is connected; and
a second tray portion formed in the rear fender, said second tray portion having a recessed shape to which a tip portion of said first drain pipe and a tip portion of a second drain pipe is connected to a base end portion which is connected to said canister, and said second tray portion has a second drain portion for discharging the liquid.

16. The straddle vehicle according to claim 15, wherein said first tray portion is disposed on the upper surface side of said fuel tank, and said second tray portion is disposed below said fuel tank.

17. The straddle vehicle according to claim 15, wherein:
a stepped portion, which forms a downwardly displaced portion with the upper surface height lowered relative to the periphery of said fuel filler opening, is formed on the front portion of said fuel tank; and
said first drain portion is formed so as to be inclined downwardly to the front direction along said stepped portion.

18. The straddle vehicle according to claim 17, wherein:
a fuel pump is supported on said downwardly displaced portion; and
said tank cover has a guide portion guiding a harness connected to said fuel pump.

19. The straddle vehicle according to claim 15, wherein:
said canister is disposed in the front and lower direction of said fuel tank; and
said second tray portion has a connecting portion to which said first drain pipe is connected in front of said canister.

20. The straddle vehicle according to claim 15, wherein said rear fender supports said canister and further including:
a charge hose for introducing the evaporated fuel from said fuel tank;
a purge hose for supplying said evaporated fuel from said canister to the inlet system; and a purge control valve for controlling said evaporated fuel supply in said purge hose.

\* \* \* \* \*